Aug. 30, 1932.  W. W. HAMPTON  1,874,041
DRILL CUTTER
Filed June 9, 1928
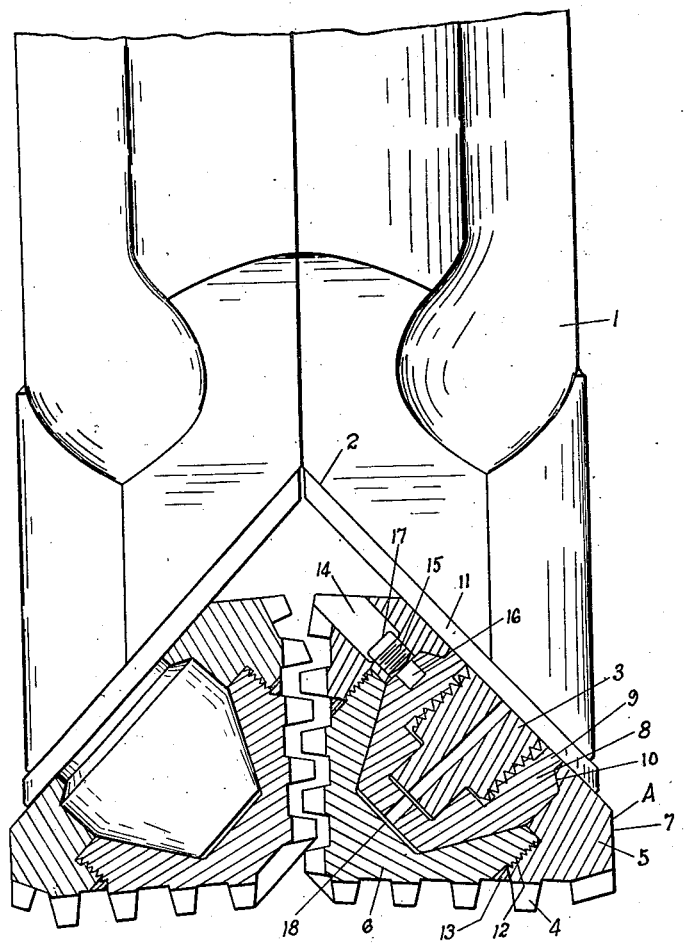
WADE W. HAMPTON  INVENTOR
BY  Jesse R. Stone
ATTORNEY.

Patented Aug. 30, 1932

1,874,041

UNITED STATES PATENT OFFICE

WADE W. HAMPTON, OF LOS ANGELES, CALIFORNIA, ASSIGNOR TO HUGHES TOOL COMPANY, OF HOUSTON, TEXAS, A CORPORATION OF TEXAS

DRILL CUTTER

Application filed June 9, 1928. Serial No. 284,046.

My invention relates to an improvement in drill cutters to be applied on well drills of the roller type and particularly to the drill known in the trade as the Hughes roller bit.

In this type of drill the cutters are two in number and are placed at the forward end of the drill head, upon pins which are integral with the body of the drill, surrounding the ends of the pins. In the previous cutters of this character it has been necessary to employ various expedients to lock the cutter upon the bushing. The usual means employed include the use of a retaining ring which is screwed into the base of the cutter behind a shoulder on the bushing. The use of this separate retaining ring involves an expense of manufacture and it is difficult to secure it in place upon the cutter.

It is an object of my invention to provide a cutter which may be assembled on the bushing without the necessity of a separate retaining ring. It is desired to form the body of the cutter in two sections which may be secured rigidly together upon the bushing and held in that position so that there will be no danger of the cutter coming off of the bushing in use.

The principal object of the invention is to provide a cutter which may be economically constructed and assembled and which may be securely locked upon the bushing.

In the drawing herewith I have shown a broken lower end of a drill having my improvement shown on the cutter attached thereto, said cutter being in vertical section.

The drill head 1, shown in the drawing, is of ordinary construction. It is made in two sections joined together centrally of the head and the lower ends of the two sections are beveled outwardly toward the lower end to provide between the two sections a notch or recess of inverted V shape. On the two faces of the recess thus provided are the supporting pins or shafts 3 for the cutters. These pins are preferably formed integral with the two sides of the head and in ordinary practice the pin projects from the flat faces of the recess in a direction approximately at right angles to the faces of the head.

The cutters, indicated generally at A, are rotatably mounted upon the cutter shafts 3. Said cutters are of approximately frusto-conical shape and are provided on their faces with teeth 4. Said cutters are made up in two sections, an inner or base section 5 and a forward section 6. The base section is of approximately ring shape, having its periphery at 7 formed to extend parallel with the side wall of the hole, said surface being ordinarily called the gage surface. The forward side of the ring has teeth 4 thereon to engage the bottom of the hole in the usual manner. The inner side of the ring section 5 is formed to engage about a bushing 8.

Said bushing is formed to fit within the cutters, being tapered towards its forward end, and having at its inner end a reduced neck 9 thus providing a shoulder 10 behind which the ring section 5 of the cutter may fit. Said bushing is screwed upon the shaft 3 and fits at its inner end against a washer 11 on the forward face of the bit.

The ring section 5 is enlarged on its inner diameter at 12, and threaded to connect with the forward section 6 of the cutter, as will be apparent from the drawing. Said forward section fits rotatably over the forward end of the bushing and when engaged with the rearward section 5 the parts may be secured rigidly together by a bond of welded material 13 which is formed in a V shaped groove around the connecting line between the edges of the two sections.

It is to be understood that this cutter will be assembled upon the bushing at the shop and will be sent to the field for use in the assembled condition shown in the drawing. The inner ring 5 is provided with a radial opening 14 thru which a wrench may be inserted in screwing the cutter upon the shaft. Said opening is threaded at 15 to receive a plug or screw and the bushing is formed with a recess 16 which may be brought into registration with the opening 14 so that when a wrench is inserted through the opening 14 to fit within the recess 16, the bushing and cutter will be held non-rotatably together so that the bushing may be screwed upon the shaft when cutters are being changed in the field. When the cutter has thus been mounted the wrench pin will be withdrawn and a plug 17 screwed in the opening 15, thus preventing the entrance of mud and grit to the bearing surface 18 of the cutter.

The advantages of this construction lie in the fact that no extra retaining ring is necessary. The sections may be screwed together about the bushing with little difficulty, it being possible to engage both sections by the ordinary wrenches employed for this purpose and a tight connection may thus be made about the bushing. The parts may then be locked against unscrewing by a bond of welded material 13. In this condition the cutters are ready to be screwed upon the cutter shaft in the usual manner. The construction is a simple and economical one and is not liable to breakage in use. When dull, the cutter may be removed and sent to the shop for resharpening, should the cutter not be worn out. If too badly worn it may be discarded.

Having thus described my invention, what I claim is new is:

1. A drill cutter, including a bushing, adapted to be secured over the end of a cutter shaft, said bushing having an inner neck of reduced external diameter, a cutter formed to fit about and enclose the forward end of said bushing, said cutter being made in two sections, means whereby said sections may be secured to each other against removal from said bushing in use, one section surrounding the largest diameter of said bushing and the other fitting upon and enclosing the forward tapered end of said bushing.

2. A drill cutter assembly, including a bushing of frusto-conical shape adapted to be secured upon the end of a cutter shaft, said bushing having an inner reduced neck forming a shoulder, a cutter formed of a toothed base section engaging behind said shoulder and surrounding the large diameter of said bushing, and a separable forward section upon the tapered forward end of said bushing, and means to connect said sections rigidly together.

3. A drill cutter assembly, including a bushing, of frusto-conical shape adapted to be secured upon the end of a cutter shaft, said bushing having an inner reduced neck forming a shoulder, a cutter formed of a base section engaging behind said shoulder and surrounding the large diameter of said bushing, and a forward section upon the tapered forward end of said bushing, said forward section adapted to screw within said base section and a bond of hard material welding said sections together.

4. In a well drill, a head, a cutter shaft, a bushing shaped to screw over and surround the end of said shaft, said bushing having a neck of reduced external diameter, a cutter shaped to fit about said bushing, said cutter being made in two sections, an inner section shaped to engage about said neck, and a forward section enclosing the forward end of said bushing cutting teeth on both sections and means to secure said sections rigidly together.

5. A cutter for well drills adapted to fit about and enclose a bushing of frusto-conical shape, including a base ring section having a lateral wrench opening therein, and a forward section fitting the forward end of said bushing and having a threaded connection with said ring section said sections both having cutting teeth thereon.

In testimony whereof, I hereunto affix my signature this 14 day of May, A. D., 1928.

WADE W. HAMPTON.